Nov. 13, 1934.　　D. S. KLAUDER, JR　　1,980,487
INCLINATION GAUGE
Filed March 24, 1933　　3 Sheets-Sheet 1
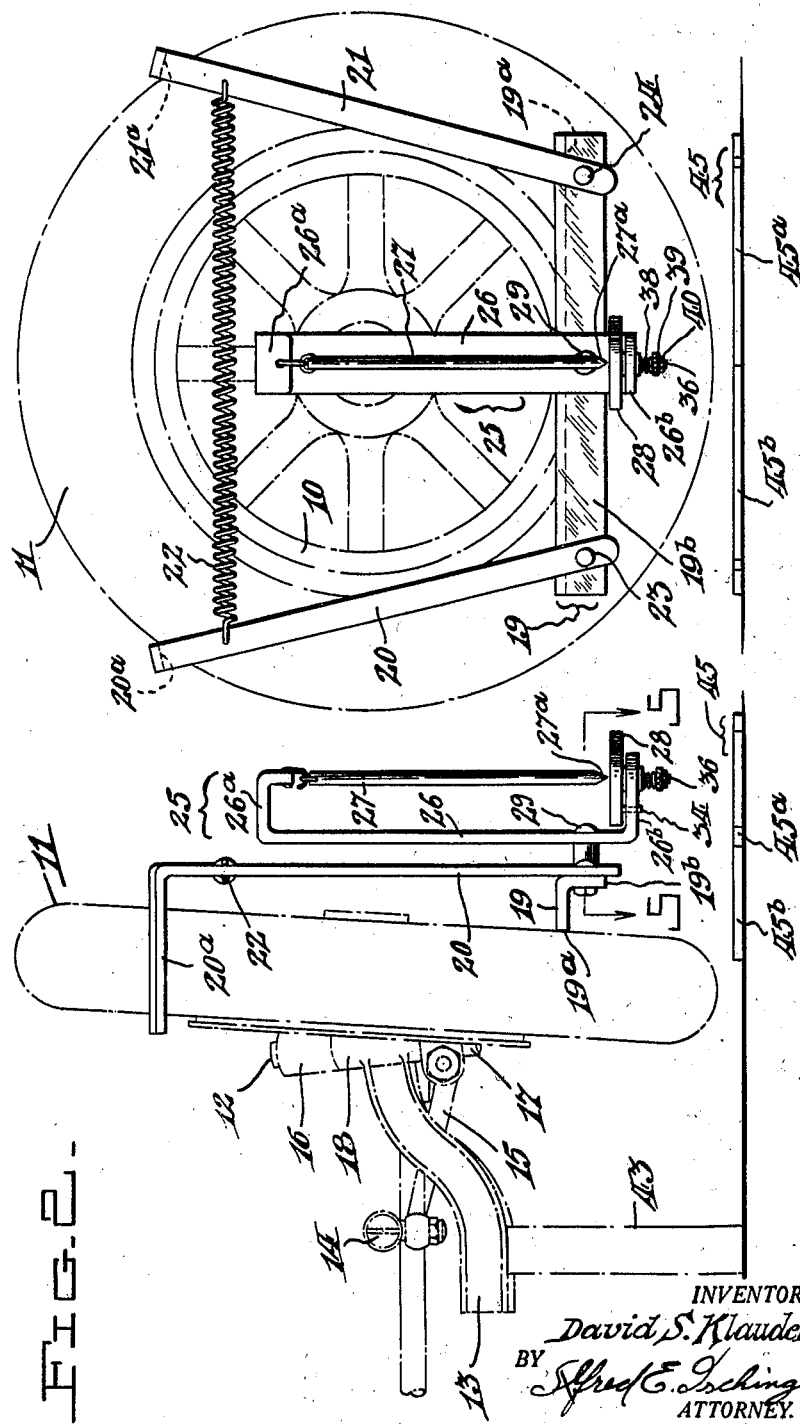
INVENTOR:
David S. Klauder Jr.,
BY Alfred E. Ischinger
ATTORNEY.

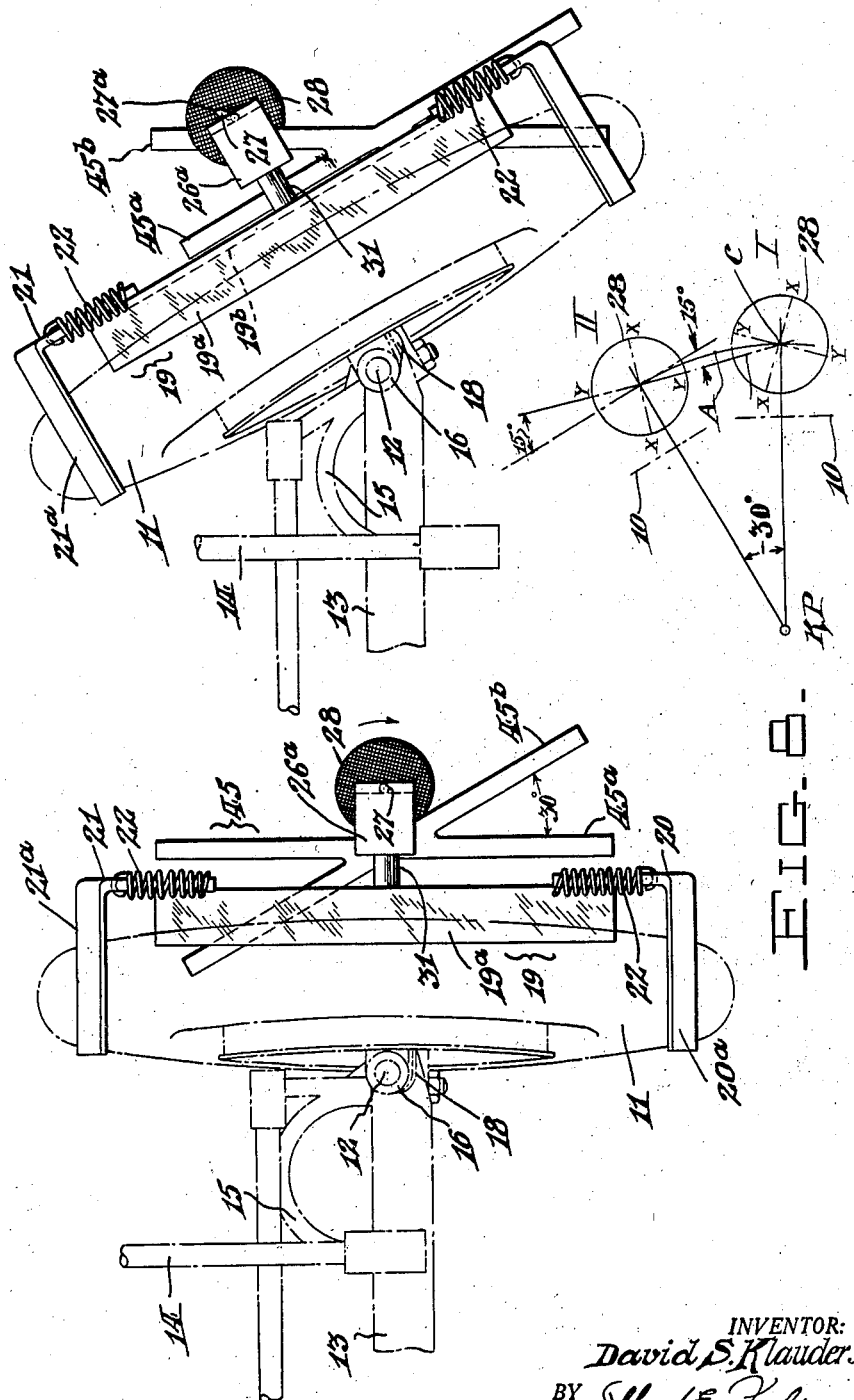

Nov. 13, 1934.  D. S. KLAUDER, JR  1,980,487
INCLINATION GAUGE
Filed March 24, 1933   3 Sheets-Sheet 3
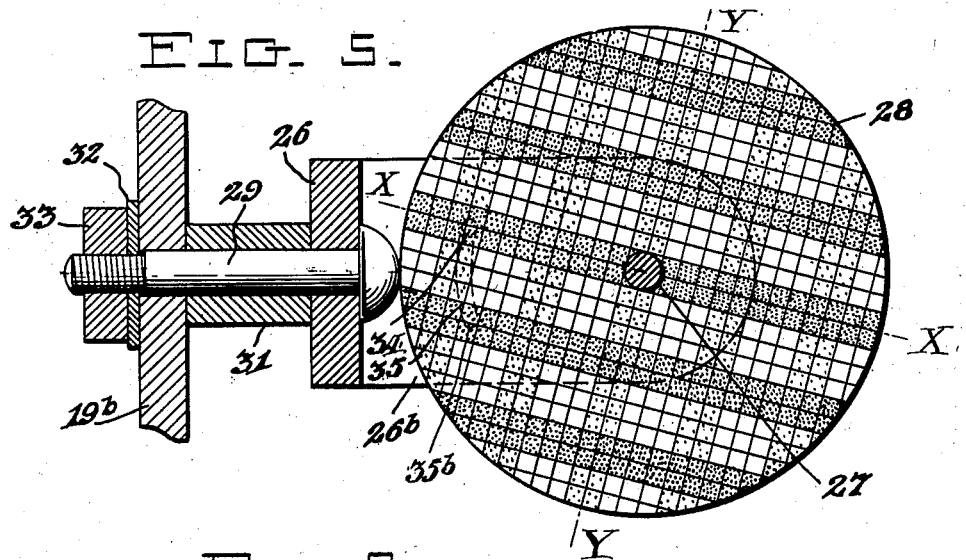
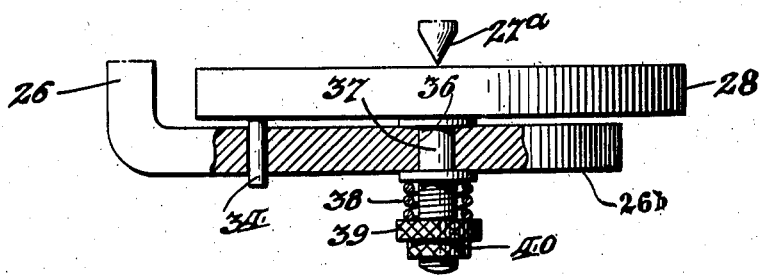
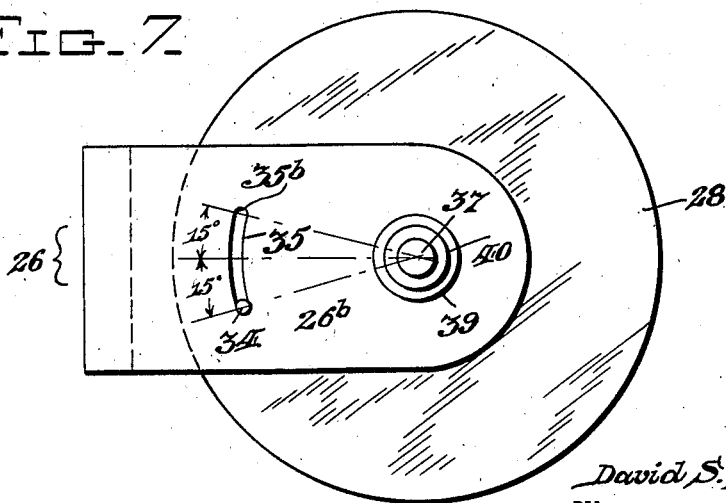
INVENTOR:
David S. Klauder Jr.,
BY
ATTORNEY.

Patented Nov. 13, 1934

1,980,487

UNITED STATES PATENT OFFICE 1,980,487

INCLINATION GAUGE

David S. Klauder, Jr., Wyomissing, Pa.

Application March 24, 1933, Serial No. 662,460

15 Claims. (Cl. 33—203)

This invention relates to novel means for determining the angle of inclination of the elements which effect tilting of a turnably mounted object, and more particularly such elements as the king-pin and axle of the front wheels of an automobile.

It is well known that the front wheels of an automobile are tilted in accordance with their king-pin inclination in order to give center point steering, decrease frictional resistance in turning the wheels and lessen the so-called "kickback" due to hitting obstructions in the road. Similarly, the front axle of such vehicles is tilted which tends to hold the front wheels in a straight forward position while driving; the amount in degrees that the top of a front axle is tilted toward the rear of the vehicle being commonly referred to as "axle caster".

Various devices have heretofore been provided for determining the individual angles of tilt of the king-pin and axle of the front wheels of an automobile, however, these are mainly unsatisfactory for this purpose in that they are more or less inaccurate, difficult to operate, expensive, and their use requires too much time and care.

Some of the objects of my invention are, to provide a novel device for determining the angles of inclination of the elements which are adapted to effect tilting of a turnably mounted object, and one which is particularly adapted for use in connection with the front wheels of an automobile and has but one gauge that simultaneously registers both king-pin and axle inclination thereof; to provide such a device which overcomes the detrimental features of the devices heretofore used; to provide a device of this type which is equipped with novel angle registering means; the provision of such a device which is simple in construction and operation as well as quickly and easily adjustable for use either with the right or left front wheel of a vehicle; and to provide a new inclination gauge with the aid of which it is possible to quickly and accurately determine, either separately or simultaneously, the king-pin and axle inclination of the front wheels of an automobile.

With these and other objects in view, which will become more apparent from the following detailed description and accompanying drawings of one practical and illustrative form of my invention, the latter comprises the novel elements, features of construction and arrangement of parts in cooperative relationship, as herein disclosed and more particularly pointed out in the appended claims.

Referring to the drawings:

Fig. 1 is a front elevational view of my novel device as it appears when applied to the front left wheel of an automobile indicated in dot-and-dash lines.

Fig. 2 is an elevational view of the device shown in Fig. 1, and as seen from the left of said figure; additional automobile parts being shown in dot-and-dash lines.

Fig. 3 is a top plan view of my novel device and the automobile parts with which it is shown associated in Fig. 2.

Fig. 4 is a view similar to Fig. 3 but shows the automobile wheel turned at an angle.

Fig. 5 is an enlarged sectional view taken as indicated by the arrows 5—5 in Fig. 2.

Fig. 6 is a partial side elevational view of the elements shown in Fig. 5, a certain part thereof being broken away and in section to more clearly show its construction.

Fig. 7 is a bottom plan view of Fig. 6.

Fig. 8 is an explanatory diagram which illustrates certain phases of my invention.

In order that the manner of application and operation of my device may be clearly understood, I have shown it mounted on the front left wheel of an automobile and have illustrated the latter together with well known associated parts in dot-and-dash lines in Figs. 1, 2, 3 and 4; the numeral 10 indicating the wheel, 11 the tire, 12 the king-pin, 13 the front wheel axle, 14 the steering rod, 15 the steering rod connecting link, 16 and 17 the king-pin wheel bearings, and 18 the king-pin axle bearing.

As clearly shown in said figures, my device is directly mounted upon the side of wheel 10, and comprises a wheel mounting or clamp consisting mainly of an angle bar 19, two similar clamp arms 20 and 21, and a tension spring 22. The edge of one side 19a of the angle bar 19 rests directly against the tire 11, while arms 20 and 21 are pivotally mounted on side 19b of angle bar 19, in suitable manner, as by screw bolts 23 and 24. The arms 20 and 21 are respectively provided at their upper ends with similar members 20a and 21a which function to directly rest on the edge of tire 11 thereby to position and support the entire wheel mounting; spring 22 having its ends connected to arms 20 and 21 and pulling the same toward each other so as to maintain the entire mounting structure clamped against the wheel in desired position.

Pivotally secured to the central part of side 19b of angle bar 19 is a tilt-operated gauge or meter generally indicated by the numeral 25, which comprises a support or bracket 26 having a tilt actuated indicator 27, in the present instance in the form of a pointed metal bar, suspended from its upper end 26a in such manner as to be freely swingable about its point of suspension; and a dial 28 mounted on the lower bracket part 26b of support 26. The support 26 is pivotally secured to side 19b of angle bar 19 in suitable manner, for example, as shown in Fig. 5, by means of a screw bolt 29 which passes through support 26, a spacing sleeve 31, angle side 19b, a lock washer 32, and is held in position by a nut 33.

Dial 28 coacts with the indicator 27 and has two sets of calibrated markings on its upper surface in the form of crossed lines which, in the present instance, divide the surface into equal squares; one series of lines being parallel to the center line $x$—$x$ and the other set parallel with the center line $y$—$y$, see Fig. 5. A pin 34 is fixedly secured to the underside of dial 28 and extends through and is freely movable in a slot 35 in bracket part 26b, said slot being concentric with a bearing aperture 36 in part 26b through which passes a stud bolt 37 fixedly secured to the bottom center of dial 28. This arrangement permits of limited rotative movement of dial 28, for purposes of adjustment thereof, as later described; a spring 38 and lock nuts 39 and 40 being provided on stud bolt 37 to maintain said dial in frictionally adjusted position.

It will be readily appreciated that by simply grasping the clamp arms 20 and 21 and moving them away from each other against the tension of spring 22, the entire device can be readily removed from the wheel. Similarly, when mounting the device it is merely necessary to separate the arms 20 and 21 sufficiently so that members 20a and 21a can be fitted over the edge of tire 11.

Before mounting my device on the wheel, the vehicle is so positioned that all the wheel centers are in a horizontal plane in order that the front wheels when turned by the steering wheel or otherwise from straight ahead position, will be tilted beyond their normal tilt in accordance with the king-pin and axle inclination, as the case may be; it being immaterial whether, for this purpose, the vehicle wheels are raised from the floor and thus maintained by a jack, as diagrammatically represented at 43, or simply leveled on the floor, or other suitable support.

After the vehicle has been positioned as above mentioned, the front wheels being pointed straight ahead, the wheels are prevented from rotating, as by applying the brakes.

My device is then mounted on the front left wheel 10, as shown in Figs. 1, 2 and 3, gauge 25 being moved on its pivot until point 27a of the indicator 27 is directly above the center of the horizontally positioned dial 28; members 20a and 21a being moved crosswise of the tire 11 if lateral tilt of the mounting 25 toward or from the wheel 10 is necessary to so position the indicator.

Dial 28 is turned on its pivot stud 37 in the direction of the arrow of Fig. 3, until movement limiting pin 34 reaches the end of slot 35. The dial 28 is then positioned as shown in Fig. 5.

A segmental member 45 is then placed upon the floor adjacent the tire 11, as shown in Fig. 3, and so positioned that its one leg or edge 45a is parallel with the angle bar 19; the other leg 45b pointing towards the right rear wheel of the vehicle. Wheel 10 is then turned through a predetermined angle, in the present instance thirty degrees, and until angle bar 19 is parallel with the leg 45b of the member 45, as clearly shown in Fig. 4.

In order that both the king-pin and caster inclination be simultaneously registered I provide the dial 28 of the gauge 25 with lines of demarcation calibrated to indicate the degrees of tilt of the wheel due to king-pin 12 and the axle 13 when the wheel 10 is moved through a predetermined angle, which in the present instance is thirty degrees; the lines on the dial 28 being arranged so that when the wheel 10 reaches the end of its turning movement the point 27a of the tilt actuated indicator 27 will arrive at a position on the dial which directly indicates the extent of each separate angle of tilt of the multiple tilt movement described by the wheel 10.

When the gauge 25 is applied to the left wheel of a vehicle it will be turned with the wheel in one direction and when attached to the right wheel it will be turned in the opposite direction. Consequently, some provision must be made so that the dial 28 may be adjusted to correctly register the angles of inclination of the king-pin 12 and axle 13, when the gauge 25 describes its multiple tilt movement in either direction. It is for this purpose that the dial 28 is mounted for limited rotative movement as described.

By referring now to the various figures in conjunction with the explanatory diagram of Fig. 8, which illustrates certain phases of my invention as more particularly disclosed in Figs. 3 and 4, it will be noted that the rotary or turning movement of an object, (such as automobile wheel 10) about an inclined axis "KP" (combined caster and king-pin inclination) will cause a relatively fixed point (point of suspension of indicator 27) to describe an arc in accordance with the multiple tilt of the axis KP. During such movement a tilt actuated indicator, (27a) which has been initially set at zero (center) position on dial 28 when the object (wheel 10) occupies the position of Fig. 3, will move in as many different directions as the axis KP has been inclined or, in other words will describe a composite movement which is effected by the separate angles of inclination of axis KP.

This will be clear when it is considered that king-pin tilt only would cause point 27a to describe one arc when the automobile wheel 10 is rotated through a predetermined angle, and that caster tilt only would cause point 27a to describe another arc under similar conditions. Hence both king-pin and caster tilt acting simultaneously will cause point 27a to describe a third arc.

As the dial 28 is turned about the axis KP from position I to II, Fig. 8, the markings or center lines $x$—$x$ and $y$—$y$ thereon, which, in accordance with my invention, extend obliquely with respect to the radius line KP—C of the arc of rotation "A" of the dial center point "C", will change their angle relative to the direction of travel of the tilt actuated indicator 27a. Consequently, when the dial 28 reaches position II the markings thereon must be correctly positioned with allowance for this change brought about by such turning movement, and I have found that for a rotation of the dial 28 through an arc of thirty degrees it is necessary, in order to obtain true readings, that the line $x$—$x$ must extend at an angle of fifteen degrees relative to the radius line KP—C and that the line $y$—$y$ must be at right angles to the line $x$—$x$ so positioned.

The reason for setting the lines $x$—$x$ and $y$—$y$ on the dial 28 at an angle by turning it in the direction of the arrow in Fig. 3, when my device is applied to the left wheel of the automobile, will now be clear. It will also be apparent from the foregoing that when my device is applied to the right wheel, turning movement of the wheel being in the opposite direction, the dial must be rotated in the opposite direction to establish proper direction of the lines of demarcation to obtain correct readings.

The dial 28 is so calibrated and marked that the number of squares that indicator point 27a has moved parallel to line x—x from the dial center shows the degrees of caster; movement of the indicator point away from the car indicating positive caster, i. e., inclination of the top of the axle towards the rear of the vehicle, and movement of the indicator point towards the vehicle indicates negative caster, i. e., inclination of the top of the axle towards the front of the vehicle.

Similarly, the number of squares that the indicator point moves parallel to line y—y, from the dial center, shows the degree of king-pin tilt. Indicator point 27a moving toward the rear of the vehicle indicating positive tilt, i. e., the top of the king-pin tilted towards the right front vehicle wheel, and movement of the indicator point 27 towards the front of the car indicating negative tilt, i. e., the top of the king-pin tilted towards the left front vehicle wheel.

In order to facilitate reading of the dial and to quickly differentiate the degrees of king-pin and caster inclination, the lines parallel with center lines x—x and y—y may be suitably and contrastingly colored; any desired number of degrees (squares) coming between the colored lines. Or, as illustrated in Fig. 5, the dial may be divided into bands of two contrasting colors which cross each other at right angles, each band being two degrees wide and the space from center to center of two adjacent bands representing five degrees.

After the readings of the left wheel have been obtained, as described, the said wheel is turned to straight ahead position with respect to the vehicle. The device is then detached therefrom and mounted on the right front wheel of the vehicle in similar manner. Before turning the right wheel to obtain the readings as before, dial 28 is partially rotated until stop pin 34 comes to rest in the end 35b of slot 35; dial 28 having then been rotated through an angle of thirty degrees. The segmental member 45 when used in connection with the right vehicle wheel is placed so that its one leg or edge points in the direction of the left rear wheel of the vehicle. In other words, the movement carried out by the right front wheel being reversed, the dial 28 and positioning of segmental member 45 must likewise be reversed.

Of course, my device for determining the degree of inclination of the king-pin and axle tilts, as set forth, can be changed and modified in various ways without departing from the invention herein disclosed and hereinafter claimed, and can obviously be utilized to separately or simultaneously and similarly determine the angle of inclination of other elements which are adapted to effect tilting of a turnably mounted object. It is also to be understood that it is merely necessary to suitably connect the device for movement with an object, such as an automobile wheel, in order to obtain the results as explained and it is, therefore, not essential for this purpose that the device be mounted as specifically shown. Furthermore, it will be clear from the foregoing that the angle of rotation of the object or wheel can be varied if the angle of the dial lines is correspondingly varied.

I claim:

1. A device for registering the angle of inclination of an element which is adapted to effect tilting of a turnably mounted object, comprising a gauge adapted to be connected with said object for movement therewith and having in combination a tilt actuated indicator, and a substantially horizontally positioned dial adapted to cooperate with the latter and having a series of markings thereon extending in a straight line arranged obliquely with respect to the radius line of the arc of rotation of the dial center point.

2. A device for registering the angle of inclination of an element which is adapted to effect tilting of a turnably mounted object, comprising a gauge adapted to be connected with said object for movement therewith and having in combination a tilt actuated indicator, and a substantially horizontally positioned dial adapted to cooperate with the latter and having a plurality of parallel gauge lines thereon each extending obliquely with respect to the radius line of the arc of rotation of the dial center point.

3. A device for simultaneously registering the separate angles of inclination of a plurality of elements which are adapted to effect multiple tilting of a turnably mounted object, comprising a gauge adapted to be connected with said object for movement therewith and having in combination a tilt actuated indicator, and a substantially horizontally positioned dial adapted to cooperate with the latter and having a plurality of series of parallel markings thereon, the markings of each series extending obliquely with respect to the radius line of the arc of rotation of the dial center point.

4. A device for simultaneously registering the separate angles of inclination of a plurality of elements which are adapted to effect multiple tilting of a turnably mounted object, comprising a gauge adapted to be connected with said object for movement therewith and having in combination a tilt actuated indicator, and a substantially horizontally positioned dial adapted to cooperate with the latter and having two sets of parallel gauge lines thereon, the lines of each set extending at right angles with respect to each other and obliquely with respect to the radius line of the arc of rotation of the dial center point.

5. A device for simultaneously registering the separate angles of inclination of a plurality of elements which are adapted to effect multiple tilting of a turnably mounted object, comprising a gauge having in combination a tilt actuated indicator, a substantially horizontally positioned dial adapted to cooperate with the latter and having a series of parallel markings thereon, the markings of each series being arranged obliquely with respect to the radius line of the arc of rotation of the dial center point; and mounting means for said gauge adapted to be secured for rotation with said object.

6. A device for simultaneously registering the separate angles of inclination of a plurality of elements which are adapted to effect multiple tilting of a turnably mounted object, comprising a gauge having in combination a tilt actuated indicator, a substantially horizontally positioned dial adapted to cooperate with the latter and having a plurality of series of parallel markings thereon; and supporting means for said gauge adapted to be connected with said object for movement therewith, said dial having limited rotary movement so as to position the markings of each series obliquely with respect to the radius line of the arc of rotation of the dial center point.

7. A device for simultaneously registering the separate angles of inclination of a plurality of elements which are adapted to effect multiple tilting of a turnably mounted object, comprising a gauge having in combination a tilt actuated indicator, a substantially horizontally positioned dial adapted to cooperate with the latter and having a plurality of series of parallel markings thereon; supporting means for said gauge adapted to be connected with said object for movement therewith, said dial having limited rotary movement so as to position the said markings of each series obliquely with respect to the radius line of the arc of rotation of the dial center point; and means for limiting said rotary dial movement.

8. A device for simultaneously registering the separate angles of inclination of a plurality of elements which are adapted to effect multiple tilting of a turnably mounted object, comprising a gauge having in combination a tilt actuated indicator, a substantially horizontally positioned dial adapted to cooperate with the latter and having a plurality of series of parallel markings thereon; supporting means for said dial adapted to permit of limited rotary movement of the dial so as to position the markings of each series obliquely with respect to the arc of rotation of the dial center point; means for limiting said rotary dial movement; and means for mounting said gauge on said object.

9. A device for simultaneously registering the separate angles of inclination of a plurality of elements which are adapted to effect multiple tilting of a turnably mounted object, comprising a gauge having in combination a tilt actuated indicator, a substantially horizontally positioned dial adapted to cooperate with the latter and having a plurality of series of parallel markings thereon, and common supporting means for said indicator and dial adapted to permit of limited rotary movement of the latter so as to position the markings of each series obliquely with respect to the radius line of the arc of rotation of the dial center point; and means adapted to pivotally secure said gauge to said object.

10. A device for simultaneously registering the angle of inclination of the king-pin and axle of the front wheel of a vehicle comprising a multiple inclination registering gauge including a dial having a plurality of series of parallel markings thereon, and a dial mounting adapted to be connected with said wheel and maintain said dial in substantially horizontal position with the markings of each series extending obliquely with respect to the radius line of the arc of rotation of the dial center point.

11. A device for simultaneously registering the angle of inclination of the king-pin and axle of the front wheel of a vehicle comprising a multiple inclination registering gauge including a dial having a plurality of series of parallel markings thereon, and a cooperating tilt actuated indicator, a gauge mounting pivotally secured to said wheel with the markings of each series extending obliquely with respect to the radius line of the arc of rotation of the dial center point.

12. A device for simultaneously registering the angle of inclination of the king-pin and axle of the front wheel of a vehicle comprising a multiple inclination registering gauge including a dial having two sets of parallel gauge lines thereon, and a cooperating tilt actuated indicator; a gauge mounting adapted to be pivotally secured to said wheel with the markings of each set extending obliquely with respect to the radius line of the arc of rotation of the dial center point.

13. A device for simultaneously registering the angle of inclination of the king-pin and axle of the front wheel of a vehicle comprising a multiple inclination registering gauge including a supporting bracket, a dial having a plurality of series of parallel markings thereon pivotally mounted on said bracket, a tilt operated indicator on said bracket, a movement limiting pin carried by said dial, said bracket having a slot therein into which said pin is adapted to extend; a mounting clamp adapted to be secured to said wheel; and means pivotally connecting said clamp and bracket.

14. A device for simultaneously registering the angle of inclination of the king-pin and axle of the front wheel of a vehicle comprising a multiple inclination registering gauge including a supporting bracket, a dial having a plurality of series of parallel markings thereon pivotally mounted on said bracket so that said dial may be rotated to thereby position said markings of each series to extend obliquely with respect to the radius line of the arc of rotation of the dial center point, and movement limiting means on said dial adapted to coact with said bracket; a mounting clamp adapted to be secured to said wheel including a wheel contacting crossbar, a pair of clamp arms pivotally secured to said bar, and resilient means tending to urge said arms toward each other; and means pivotally connecting said bracket and clamp.

15. A device for registering the angle of inclination of an element which is adapted to effect tilting of a turnably mounted automobile wheel, comprising a gauge adapted to be connected with said automobile wheel for movement therewith and having in combination a tilt actuated indicator, and a substantially horizontally positioned dial adapted to cooperate with the latter and having a series of markings thereon extending in a straight line arranged obliquely with respect to the radius line of the arc of rotation of the dial center point.

DAVID S. KLAUDER, JR.